United States Patent [19]

Vorst et al.

[11] 3,996,673
[45] Dec. 14, 1976

[54] IMAGE GENERATING MEANS

[75] Inventors: Carl J. Vorst, Overland; John Mackey, St. Charles, both of Mo.

[73] Assignee: McDonnell Douglas Corporation, St. Louis, Mo.

[22] Filed: May 29, 1975

[21] Appl. No.: 581,835

[52] U.S. Cl. .............................. 35/10.2; 35/12 N; 178/DIG. 22; 178/DIG. 35; 235/151
[51] Int. Cl.[2] ...................... G09B 9/08; H04N 7/00
[58] Field of Search ................ 35/10.2, 12 K, 12 N, 35/12 P; 46/1 B; 178/DIG. 22, DIG. 35; 235/151; 340/324; 315/18

[56] References Cited

UNITED STATES PATENTS

| 3,320,409 | 5/1967 | Larrowe | 235/151 |
|---|---|---|---|
| 3,422,419 | 1/1969 | Mathews et al. | 340/324 |
| 3,497,760 | 2/1976 | Kiesling | 315/18 |
| 3,520,994 | 7/1970 | McAfee et al. | 35/10.2 |
| 3,580,978 | 5/1971 | Ebeling | 35/10.2 |
| 3,602,702 | 8/1971 | Warnock | 235/151 |
| 3,787,619 | 1/1974 | Wolff | 178/DIG. 35 |
| 3,833,759 | 9/1974 | Yatabe et al. | 178/DIG. 35 |
| 3,878,327 | 4/1975 | Uhler | 178/DIG. 35 |

Primary Examiner—Felix D. Gruber
Attorney, Agent, or Firm—Lionel L. Lucchesi

[57] ABSTRACT

An apparatus for generating computed images on an electronically controlled display surface is provided which uses a function module for generating the deflection voltages necessary to display a shape, the shape being defined in terms of right edge and left edge vectors. The vectors comprise line segments, placed end-to-end until a closed shape is formed. Each line segment is defined by a start point and slope to the next vector start point. The shape is constructed by sweeping the beam of a cathode ray device in an X coordinate direction and comparing the instantaneous X coordinate beam position with the instantaneous X position of the left edge and right edge vectors. Upon the determination that the beam has passed beyond the coordinate position of the right edge or left edge vectors defining the image, beam intensity is blanked and the Y coordinate of the beam is incremented. Upon the determination that the beam has passed beyond the next coordinate position of the right edge or left edge vectors, and sufficient time has been allowed for the new Y position of the beam to become stable and for various computations to be completed, beam direction is reversed. Upon determination that the beam has passed within the next coordinate position of the right edge or left edge vectors respectively, new right edge or left edge values are generated and the beam intensity is again unblanked. The Y coordinate position of the beam is monitored and new vectors commanded whenever the Y ordinate of the preceding vector end is reached. Successive vectors are ordered until the desired, closed image is completed. Means also are provided for varying the intensity of the CRT display to permit CRT simulation of real time visual phenomenon.

23 Claims, 6 Drawing Figures

IMAGE GENERATING MEANS

BACKGROUND OF THE INVENTION

This invention relates to the generation and display of computed images, and more specifically, to the visual presentation of an airfield runway and associated visual cues necessary for accurate aircraft flight simulation. While the invention is described in particular detail with respect to such visual simulation use, those skilled in the art will recognize the wider applicability of our invention to other applicational forms of computer generated display images.

The prior art exhibits a number of examples of devices useful in providing CRT displays of desired images. The invention described hereinafter is particularly concerned with the use of CRT displays in aircraft flight simulators. Commonly, modern simulators are exact mock-ups of the particular aircraft for which training is being provided. That is to say, the flight deck of a particular aircraft is recreated so that flight crews can fly the simulator prior to flying the actual aircraft. It is conventional to provide sound, motion, and visual sensory perception to the flight crew during such simulated flight. Modern simulators provide physical sensations that closely approximate those experienced in actual flight.

One of the more common simulation experiences for which training is provided is landing and takeoff of the aircraft. Commonly, the pilot of the simulator is provided with CRT (Cathode Ray Tube) displays which correspond to the window view of the pilot. That is, the windows of the aircraft are replaced in the simulator by CRT displays. A computer generated graphic scene, or a closed circuit television system using a scale model of the scene to be displayed is utilized to control the CRT display and to provide the image desired. Presently, two computer generated graphic methods commonly are employed to generate two and three dimensional objects on a conventional CRT display. One method places the beam at a particular location on the face of the display, and moves the beam from its start position to a designated end point, thereafter redesignating the beam to a new starting point. The second method requires the element by element computation of the intersection of the scene viewed through the aircraft window with the raster background. In either case, complex circuitry is required to generate the required control voltages with sufficient speed and precision when a number of scene components are displayed.

The invention disclosed hereinafter provides a real time window image to an observer by determining the control points of a desired outline for a given shape. These control points are converted to X-Y coordinates corresponding to the CRT display. Left edge and right edge vectors are generated which connect an initial point to successive ones of the outline calculated points. The vectors consist of line segments, placed end-to-end, defined by line segment start point and the slope to the next line segment start point. The shape is constructed by sweeping the CRT beam in the X coordinate direction, and comparing the instantaneous X beam position with the left edge and right edge vectors. Upon comparison, beam intensity is blanked, the Y coordinate of the beam incremented, the beam direction reversed, the beam intensity again unblanked, and new vector edge values are generated. A wide variety of image shapes can be presented utilizing this technique.

The particular embodiment disclosed also provides means for varying the intensity of the display for additional display realism. In general, prior art devices also have required complex circuits to obtain intensity variation of a generated scene. As will be appreciated by those skilled in the art, it is desirable, in simulator design, to provide a depth cue to the pilot in addition to the impression of depth provided by conventional perspective. The invention disclosed accomplishes intensity variation by generating a shading function in real time which is controlled by predetermined intensity coefficients at the corners of the display window and by the instantaneous X-Y position of the beam of the CRT.

One of the objects of this invention is to provide a more economical device for generating deflection voltages for a CRT display.

Another object of this invention is to provide an electronically less complex device for generating control voltages for a CRT display.

Another object of this invention is to provide a CRT display having increased realism over known prior art devices.

Yet another object of this invention is to provide a CRT display in which the beam is swept in the X coordinate direction and reversed in a blanked-out area of the screen.

Another object of this invention is to provide an improved method and device for generating a shading function for a CRT image.

Other objects will be apparent to those skilled in the art in light of the following description and accompanying drawings.

SUMMARY OF THE INVENTION

In accordance with this invention, generally stated, a device for generating the control voltages of a display means is provided in which the outline points of an image form an input to the device. In the preferred embodiment, the display means comprises a cathode ray tube (CRT) display. Means for generating edge vectors from and between a start point and respective ones of the outline points are provided and include a right edge vector and a left edge vector generator. The desired image is constructed by sweeping the CRT beam in the X coordinate direction and comparing the instantaneous beam position with the left edge and right edge vectors. Upon comparison, beam intensity is blanked, the Y coordinate of the beam incremented, the beam direction is reversed, the beam intensity is again unblanked, and new edge values generated. Means are provided for comparing the Y coordinate position of the beam with the known outline points. When corresponding Y coordinate points are detected, new left edge and right edge vectors are generated, and the operation is repeated until a closed figure is obtained. A shading function generator for providing a depth cue by varying image intensity is provided in which the intensity of the corner points of the display are determined. Those values, along with the instantaneous X-Y position of the beam are utilized to interpolate the image intensity for all points within the display window.

DESCRIPTION OF THE PREFERRED EMBODIMENT

Figures 1, 1A:
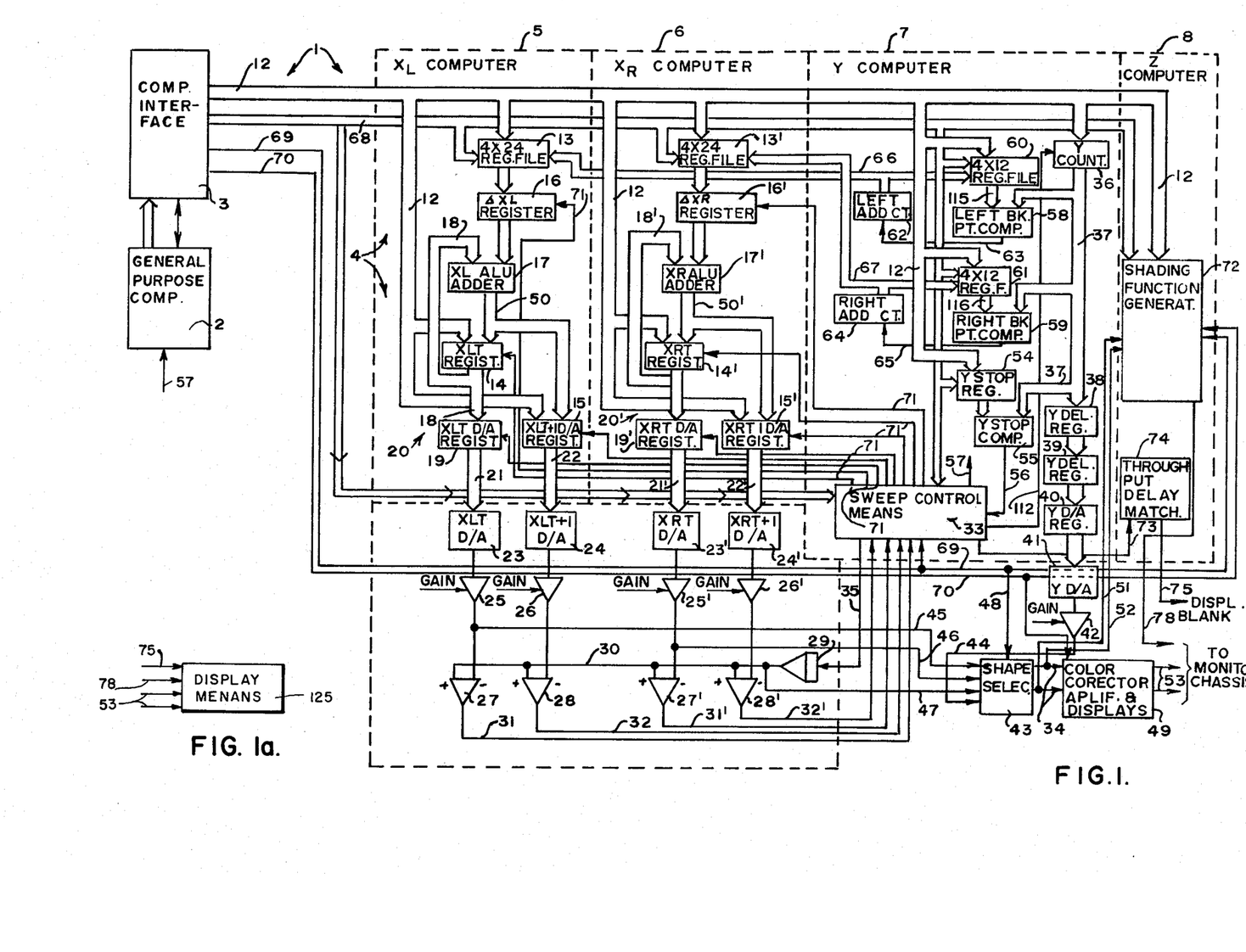
FIG. 1 is a block digrammatic representation of image generating device of this invention.
FIG. 1a is a block diagrammatic representation of a display means utilized in conjunction with the image generating device of FIG. 1.

Referring now to FIG. 1, reference numeral 1 indicates one illustrative embodiment of image generating device of this invention. The device 1 includes a general purpose computer 2, and an appropriate interface 3 for supplying certain information, later described in greater detail, to a vector generator means 4. Vector generator means 4 includes a left edge vector $X_L$ computer indicated by the numeral 5, a right edge vector $X_R$ computer indicated by the numeral 6, and a Y computer 7. The device 1 also includes a Z computer 8. The computer 8, while strictly not required for image generation, is important in that it provides intensity variation for the device 1. This, in turn, enables the device 1 to perform more realistically than previously known prior art devices.

Figure 5:
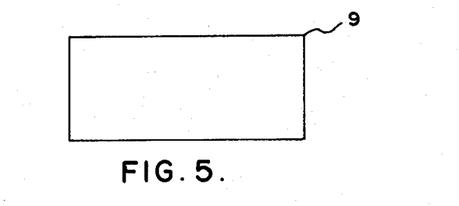
FIG. 5 is a quadrilateral illustrating an image prior to its conversion to window scene coordinates.

The block diagram shown in FIG. 1 can be best followed by first describing the effect that output of the device 1 has on the face of a CRT. In turn, that is best understood by referring to FIGS. 3 and 5. As shown in FIG. 5, a quadrilateral 9, defined in data coordinates, forms an input to the computer 2. The computer 2 takes the input data and computes a new quadrilateral 10, defined in display coordinates X and Y of a window 11. The display at the window 11 conventionally is the face of the CRT. The computer also performs any clipping operation, if necessary, where the quadrilateral 10 intersects the edges of the window 11. In the example illustrated, however, the quadrilateral 10 does not so intersect, a simplification made in order to facilitate the operational description. Those skilled in the art also will recognize that any variety of shapes may be formed in addition to or in place of the quadrilateral 10, the quadrilateral 10 being utilized merely for illustrative purposes.

Figure 3:
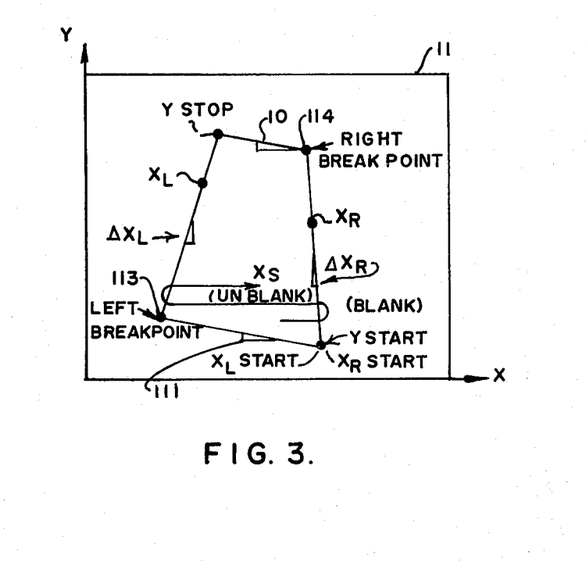
FIG. 3 is a diagrammatic representation of a window scene demonstrating the operation of the device of FIG. 1.

The computer 2, in transforming the quadrilateral 9 to the quadrilateral 10, generates coordinates Y start, $X_L$ start, $X_R$ start, a left break point, a right break point, Y stop, and incremental values in X for the right and left edge vectors, indicated generally by the notations $\Delta X_L$ and $\Delta X_R$. With the quadrilateral shown, two $\Delta X_L$ and two $\Delta X_R$ values are generated. These various points are illustrated in FIG. 3. Thus, the left side of the quadrilateral 10 may be constructed by starting the image at the point defined by $X_L$ start, $X_R$ start, and Y start, the $X_L$ and $X_R$ start values being equal, and generating vectors between $X_L$ start and the left break point. At that time, a new vector can be generated between the left break point and Y stop. Similarly, the right side of the quadrilateral 10 may be constructed by generating vectors between $X_R$ start and the right break point. At that time, a new vector can be generated between the right break point and Y stop. $\Delta X$ is, as shown, the change in X per one raster line change in Y. Consequently, $\Delta X$ is computed by computer 2 for each vector needed to close the desired image along the right and left edges of that image. The coordinate information so computed is maintained in a 33-word table in the computer 2, not all words being used. The vector generator 4 utilizes the coordinate information to generate the left and right edge vectors. When presentation of the quadrilateral 10 is desired, the beam of the CRT is caused to sweep the face of the CRT. The sweep is blanked until a determination is made that the sweep has entered the left or right edge of the quadrilateral 10. At that point, the sweep intensity is unblanked, and the beam paints a raster line until it crosses the other edge vector. In the simulator application disclosed, the beam of the CRT device has a quiescent position on the left side of the window 11. The beam starts rightwardly, referenced to FIG. 3, until it encounters the left edge vector $X_L$, at which time it is unblanked. It continues rightwardly until it meets the right edge vector $X_R$, at which time the sweep is blanked. After the beam passes the right edge vector, it is incremented one raster line, and the direction is reversed.

It is important to note that the beam is incremented in a blanked area of the window 11, and that the beam of the CRT sweeps in parallel raster lines. The quadrilateral 10 is intended to represent an airport runway in the application disclosed. By sweeping along parallel raster lines and reversing the beam in a blanked portion of the display, the edge of the quadrilateral 10 is not double activated by the beam, as is the case in systems which reverse the beam pattern at the edge of the defined image. Consequently, the edge quality of the image presented with our invention is far superior to other known devices.

The beam sweeps unblanked between the left and right edge vectors until a break point is reached. At that time, the left edge computer 5 or the right edge computer 6 is activated so that it generates a new vector, the process being repeated until Y stop is reached. At that time, an image complete signal is generated.

The generation of electrical equivalents for the $X_L$ vector, the $X_R$ vector, and the Y coordinate break point determination are accomplished in the left edge computer 5, right edge computer 6, and Y computer 7, best described in conjunction with FIG. 1.

The coordinate information for the quadrilateral 10, that is $X_L$ start, $X_R$ start, and Y start, the $\Delta X_L$ and $\Delta X_R$ values, the various break points and the Y stop information, form an input to the vector generator means 4, along a distribution bus 12. The left edge vector computer 5 and right edge vector computer 6 are similar, and only the left edge computer 5 is described in particular detail, prime numerals being utilized to indicate like parts for the right edge vector computer 6, where appropriate.

The initial information from the distribution bus 12, concerning the X coordinate for the left start point $X_L$ start, and the $\Delta X_L$ for each left edge vector $X_L$ between the left start point $X_L$ start and the successive left edge break points needed for the left edge vector to reach the Y stop value are stored in a 4 × 24 bit register file 13. This initial information from the computer 2 also forms an input, along the bus 12, to a left edge register 14, and a left edge plus 1 register 15. The information stored in the register file 13 remains available for output on command, as later described.

The output of the file 13 enters a $\Delta X_L$ register 16. The $\Delta X_L$ register 16 holds the $\Delta X_L$ value of the particular vector $X_L$ being generated and upon command, generates the value of $\Delta X_L$ as an output. The output of the $\Delta X_L$ register 16 forms an input to a left edge adder 17. A second input for the adder 17 is obtained from an output 18 of the left edge register 14. The output of adder 17, indicated generally by the numeral 50 in FIG. 1, forms an input to the registers 14 and 15.

The output 18 of register 14 also is an input to a left edge digital to analog converter holding register 19. The registers 14, 15, 16, and 19, and the adder 17 define a digital differential analyzer (DDA) 20, the components of which may be, and preferably are, constructed on a single printed circuit board. The registers 15 and 19 have outputs 22 and 21, respectively. The output 21 forms an input to a left edge digital to analog converter (D/A) 23, while the output 22 forms an input to a left edge plus one digital to analog converter (D/A) 24. The output of D/A converter 23 passes through a current to voltage converter amplifier 25, and becomes a first input to a voltage comparator 27. The output of D/A converter 24 passes through a current to voltage converter amplifier 26 and becomes a first input to a voltage comparator 28. The second input for the comparators 27 and 28 is obtained from an analog sweep generator 29 along a conductor 30. The output of the comparators 27 and 28, indicated generally by the numerals 31 and 32, respectively, are an input to a sweep control logic means 33. As indicated above, the right edge vector $X_R$ computer 6 is substantially similar to the left edge computer 5, and prime numerals have been utilized to indicate corresponding function blocks and line conductors of the computer 6.

In general, the DDA 20 and the DDA 20' solve the straight line equation $X_{t+1} = X_t + \Delta X$. $X_L$ start is an input to the register 14 along the bus 12, and $\Delta X$ is an input to the register file 13. The first output of the register file 13 is the initial $\Delta X$. indicated by the numeral 111 in FIG. 3. The register 16 holds this value and in turn feeds an input to the adder 17. The adder 17 adds the value of $\Delta X$ to the initial $X_L$ start, forming a new value of $X$. As the beam moves to the right of the left edge, registers 14, 15, 16, and 19 are loaded simultaneously along with registers 14' and 16', again generating a new value of $x$. As the beam moves to the left of the right edge, registers 14', 15', 16', and 19' are loaded simultaneously, along with registers 14 and 16, again generating a new value of $X$. In effect, $X_{t+1} = X_t + \Delta X$ is computed for every line, while the two left edge digital to analog converters 23 and 24 are updated only after the beam passes to the right of the left edge; and the two right edge digital to analog converters 23' and 24' are updated only after the beam passes to the left of the right edge. In this way register 14 is updated and the equation solved every time a new scan line is unblanked and registers 19 and 15, containing $X_t$ and $X_{t+1}$, are updated every other scan line. The updating is done such that $X_t$ is always the end point of a scan line and $X_{t+1}$ is always the start point of a scan line. Consequently, the comparators 27 and 28 are able to detect when the beam control passes through the left edge data of the image on one scan line, and when the beam control re-enters the image data on the succeeding scan line. This information is important because, as indicated above, the direction of the sweep of the beam is reversed in a blanked portion of the screen, and the position of the beam with respect to the left and right edge vectors is used to determine when an unblanking signal is to be emitted from the sweep control means 33. To recapitulate, the comparator 27 is utilized to determine when the beam passes through the left edge of the beam, assuming a right to left direction of beam travel as referenced to FIG. 3, while the output of the register 15 is compared with present beam position in the comparator 28 to determine when the beam re-enters the left edge of the image on the next highest line of the scan. A similar situation, of course, occurs along the right edge of the scan in the comparators 27', 28'. The use of the two D/A converters 23 and 24 enables our invention to exhibit greatly enhanced edge realism for the image presented at the window 11, because each sweep of the beam is unblanked only at a single point along the edge. In the simulator application discussed herein, we have found that a thousand line raster scan works well. The number of lines of the scan is sufficient so that an observer at the window 11 cannot observe the scan lines.

The output of the comparators 27 and 28 is an input to the sweep control means 33. When a comparison is made in the comparators 27, 27', the control means 33 commands reversal of the sweep generator 29 along a conductor 35. When a comparison is made in the comparators 28, 28', the control means 33 sends an output to a Y counter 36 of the Y computer 7, along a conductor 112. In addition to the present Y coordinate position of the beam from the sweep control means 33, the Y counter 36 of the Y computer 7 also receives Y start from the computer 2, along the bus 12. The Y computer 7 is responsible for monitoring the Y coordinate position of the beam. A number of functions are dependent upon the output of the Y computer, and in particular, on the output of the Y counter 36. Output of the counter 36, indicated generally by the numeral 37, is fed through a series of Y delay registers 38 and 39, to a D/A register 40. Output of the register 40 is an input to a Y digital to analog converter (D/A) 41, the output of which passes through a current to voltage converter amplifier 42. Output of the amplifier 42 is connected to a shape select circuit 43, by a conductor 44. That output corresponds to Y deflection voltage for the beam. The delay registers 38 and 39 function as a portion of a pipeline effect for the device 1. That is to say, vector values for the right and left edges of the image, and the Y coordinate of those particular points, are computed in advance to the beam reaching those points. They are stored in various registers of the device 1 until needed for proper positioning of the beam. Thus, the registers 38 and 39 are provided so that the proper Y coordinate value of the beam will be available with the proper X coordinate value of the beam as the beam traverses its parallel raster scan.

The shape select circuit 43 is conventional, and is not described in detail. It receives left edge X coordinate values of the desired shape from the output of amplifier 25 along a conductor 45, right edge X coordinate values of the desired shape along a conductor 46 from the amplifier 25', the sweep signal from the sweep generator 29, along a conductor 47, and Y coordinate values of the desired shape along conductor 44 from amplifier 42. An enabling signal from the computer 2 is an input along a conductor 48 which is electrically connected to a mode select conductor 69. The device 1 of this invention is adapted to present a variety of images at the window 11. For example, the device 1 is capable of generating light points for simulating aircraft approach patterns and runway landing lights. While the shape select circuit 43 is important in this aspect of the operation of the device 1, it is not concerned with the inventive features disclosed and, consequently, is not described in detail.

The output of the shape select circuit 43 forms an input to a color corrector amplifier and display driver circuit means 49, along a pair of conductors 34, and forms an input to the Z computer 8 along a pair of conductors 51 and 52, respectively.

Color correction amplifier and display driver circuit means 49 is conventional, and is not described in detail. Output of the circuit means 49 forms an input to the monitor chasis of which the window 11 is a part, along a pair of conductors 53. In general, the color correction means 49 functions to equate the signal strength of the various possible images that the device 1 may generate. That is, the light points mentioned above may be produced at a voltage level unsuitable for proper display. The color correction means 49 ensures that the light points, for example, are at voltage levels suitable for proper display. Again, while the means 49 is important in the operation of the device 1, it is not directly concerned with the inventive features disclosed and, consequently, is not described in detail.

As indicated above, the Y counter 36 has the value of Y start initially loaded in it along the bus 12 from the computer 2. Initially, Y stop also is an input along the bus 12 to a Y stop register 54. The output of Y stop register 54 forms an input for a Y stop comparator 55. Y stop comparator 55 receives the values of the Y coordinate position of the beam from the Y counter 36 along the output 37, and compares the instantaneous Y coordinate position value of the beam with the Y stop input. Upon comparison, the Y stop comparator 55 initiates an output signal along a conductor 56 to the sweep control 33 indicating that the image is complete. The sweep control 33 then sends an image complete signal to the computer 2 along an output 57.

Thus, the device 1 has been shown capable of generating initial left edge and right edge vectors and using these vectors to track the beam position in Y, the device 1 instituting an image complete signal when the beam reaches the coordinate value of Y stop. The time period between the generation of the initial left and right edge vectors and the image complete signal from Y stop comparator 55 is used to initiate generation of the vectors necessary to complete the desired image.

The output 37 of the Y counter 36 forms a first input to each of a left break point comparator 58 and a right break point comparator 59. Y coordinate values of the right edge break points and the left edge break points of the vectors required to complete the desired image are respective inputs, from the bus 12, to a 4 × 12 left break point register file 60, and a right break point register file 61. The left break point indicated by the numeral 113, and the right break point indicated by the numeral 114 in FIG. 3, represent the Y coordinates of the end of respective edge vectors and the start of the next succeeding edge vectors. While single right and left break points are illustrated, those skilled in the art will recognize that additional points may be stored in the various memory components of the device 1.

An output 115 of the register file 60 is a second input to the left break point comparator 58. The output of comparator 58 forms an input for a left address counter 62 along a conductor 63. The comparator 58 compares the instantaneous Y coordinate position of the beam, which is obtained from the Y counter 36, with the left break point, which is obtained from the register file 60. When a comparison is made, the left break point comparator 58 generates an output signal to the left address counter 62. The left address counter 62, in turn, initiates an output at 66 to the register file 60 and the register file 13. An input to the files 60 and 13 from the address counter 62 causes these files to initiate an output signal corresponding to the next left break point and $\Delta X_L$ values, respectively.

An output 116 of the register file 61 is a second input to the right break point comparator 59. The output of comparator 59 forms an input for a right address counter 64 along a conductor 65. The comparator 59 compares the instantaneous Y coordinate position of the beam, which is obtained from the Y counter 36, with the right break point, which is obtained from the register file 61. When a comparison is made, the right break point comparator 59 generates an output signal to the right address counter 64. The right address counter 64, in turn, initiates an output at 67 to the register file 61 and the register file 13'. An input to the files 61 and 13' from the address counter 64 causes these files to initiate an output signal corresponding to the next right break point and $\Delta X_R$ values, respectively.

Routing of initial information concerning the image desired is controlled by operation of a load control input 68 to various registers and register files. The mode select conductor 69 forms an input from the interface 3 to the shape select means 43 via the conductor 48, which functions to control application of the various image possibilities discussed above. A color control conductor 70 also extends between the interface 3 and the color correction amplifier and display circuit means 49, for initializing operation of the circuit means 49, which again, as indicated above, is not directly concerned with the invention disclosed herein.

Sweep control 33 has a plurality of output conductors indicated generally by the numeral 71, which extends between the sweep control 33 and the registers 16, 16', the registers 14 and 14', the registers 19 and 19', and the registers 15 and 15'. The conductor plurality 71 conducts a load signal from the sweep control to those respective registers, whenever it is necessary to increment those respective registers. Sweep control 33 obtains that information from the comparators 27, 27', and 28, 28'. Thus, it may be seen that the sweep control 33 will increment the DDA's 20 and 20', while the Y computer 7 determines when the new values of $\Delta X_L$ and $\Delta X_R$ are to be entered from the files 13 and 13' to the registers 16 and 16'.

As thus described, the device 1 is capable of directing the formation of an image on a CRT or display means indicated generally by the reference numeral 125 in FIG. 1a, which image preferably has a thousand line scan, having excellent edge granularity for exceptional realism. In addition, the same circuitry is capable of generating the image in real time. That is, the computer 2 may successively compute the image appearance as the aircraft simulator approaches the runway generated. The computer 2 transforms each new image required into coordinates of the window 11, and provides outline points of the image to permit the generation of successive vectors from a start point to a stop point. The shape is constructed by sweeping the beam of the CRT in an X coordinate direction, and comparing the instantaneous X coordinate beam position with the left edge and right edge vectors. The Y coordinate position of the beam is monitored, and new vectors commanded whenever the Y coordinate of the preceding vector end is reached.

The Z computer 8 is that portion of the device 1 responsible for providing a depth cue to an observer of an image in the window 11. Computer 8 includes a shading function generator 72 and a throughput delay matching means 74. The shading function generator 72 receives input information from the computer 2 along the bus 12 and load control along the load control input 68. The generator 72 also receives instantaneous beam coordinate information from the shape select means 43 along the conductors 51 and 52, and mode select and color control signals along the conductors 69 and 70, respectively. Shading function generator 72 has an output conductor 78, which forms an input to the chasis of the cathode ray device.

Sweep control means 33 generates an unblanking signal along a conductor 73 to the throughput delay matching means 74. The delay matching means 74 primarily functions in a coordinating capacity, which is necessary because of transmission time differences between various units of the device 1. An output conductor 75 of the delay matching means 74 forms an input, along with the terminal pairs 53, to the monitor chasis, not shown, of which the window 11 is a part.

Figure 2:
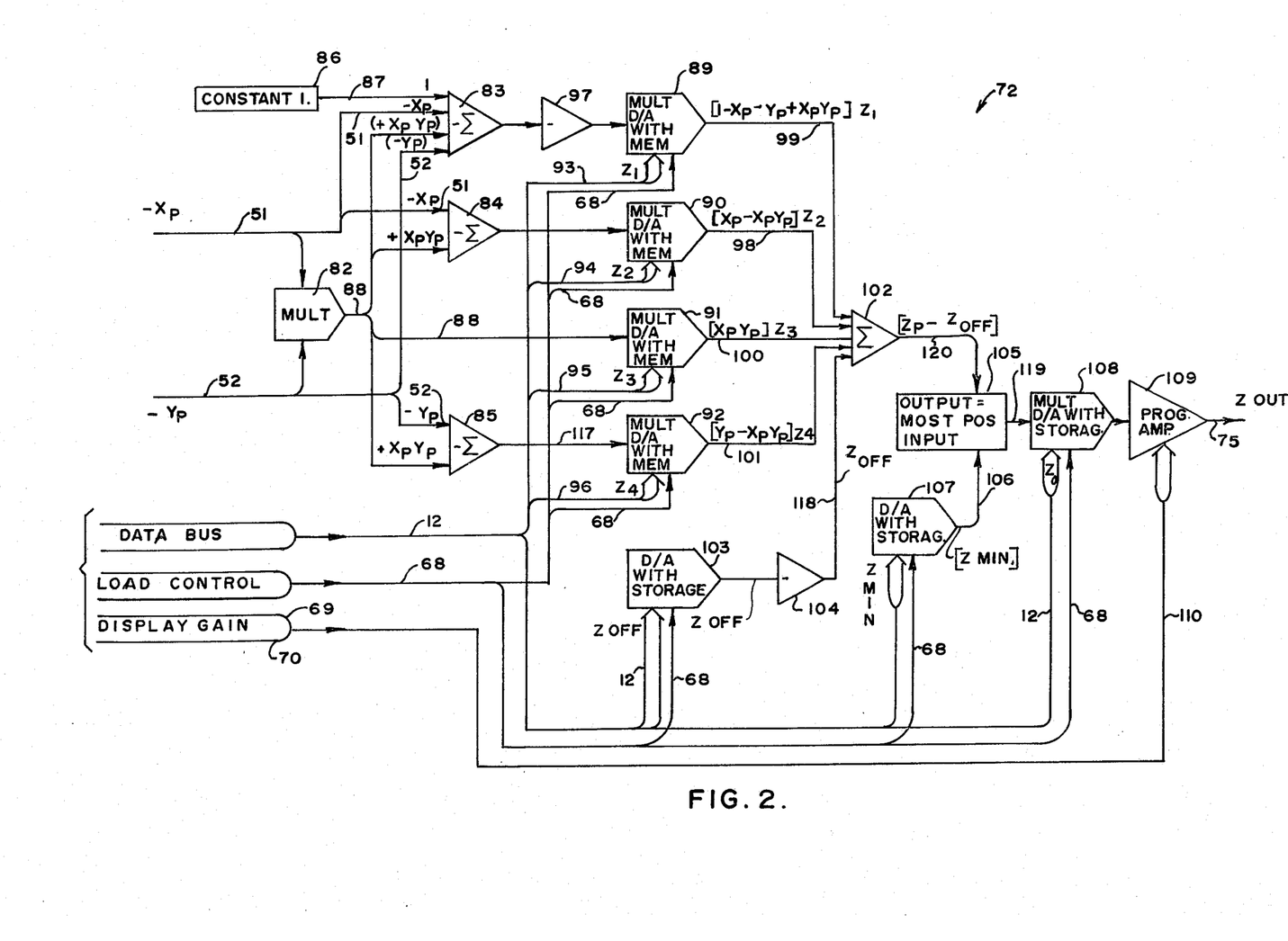
FIG. 2 is a detailed block diagrammatic representation of a shading function generator utilized in conjunction with the device of FIG. 1.
Figure 4:
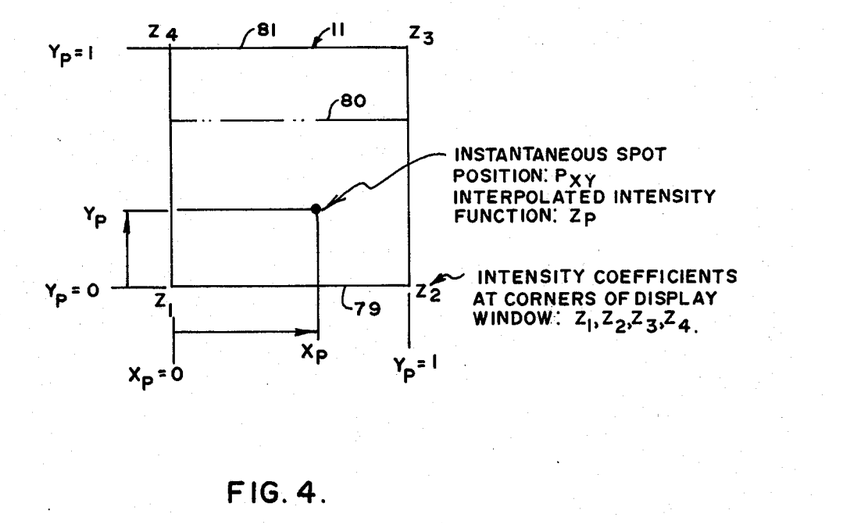
FIG. 4 is a diagrammatic representation useful in demonstrating the operation of the shading function generator illustrated in FIG. 2.

Operation of the shading function generator 72 is best understood and described in conjunction with FIGS. 2 and 4. The diagrammatic representation of FIG. 2 is the electronic analogy for the concept that a reasonable approximation for distance to a point in the ground plane, as viewed through the display window 11, may be obtained by computing the exact range of the observer of the window 11, to known point of the display window, for example, the window corners where the ground plane intersects or the intersection of the horizon with the window edges, and performing a linear interpolation in the coordinates of the display window, between the known points, and the point in the window having the unknown range. Since the intensity of a point in the ground plane will vary directly with range to that point, other factors remaining constant, the distance or range to a point in the ground plane can be utilized as a representation of intensity.

In applying the intensity-range equivalency to the device 1, the plane of the window 11 is considered to correspond to an intensity plane. Since the range of an observer of the window 11 to both a bottom edge 79 and to a horizon line 80 is known or can be calculated easily by the computer 2, it is possible to assign intensity values at these points. The computer 2 then, utilizing the intensity values of the known points, calculates the intensity required at an upper edge 81 of the window 11 which will be consistent with the known values. By interpolating between the intensity values at the upper edge 81 and the lower edge 79, the intensity of any point in the window 11 can be derived. Thus, the intensity of the edge 81 may be assigned a certain value, for example, 1, while the horizon line 80 may be assigned a nominal value, near, for example, 0. The computer 2, then, is utilized to extrapolate the intensity at the edge 81. Using this technique, the computer 2 is able to generate an intensity coefficient for each corner of the window 11, denominated in FIG. 4 as $Z_1$, $Z_2$, $Z_3$, and $Z_4$. The intensity coefficients are an input to the shading function generator 72 along the data bus 12. By proper selection of the intensity at the edge 79, the intensity of the image shown in the window 11 may be approximated in both X and Y directions. That is, the interpolation of the intensity for any point in the window is a complete interpolation in both the X and Y coordinate directions. Any particular point defined by coordinates $X_P$ and $Y_P$ has an associated intensity function $Z_P$ which is determined by the shading function generator 72. That intensity function is monitored in real time and changes as the aircraft simulator maneuvers with respect to the image presented in the ground plane as viewed through the window 11. The shading function generator 72, in effect, makes a continuous interpolation between the known intensity of the corner points $Z_1$, $Z_2$, $Z_3$, $Z_4$, and the instantaneous point position defined by coordinates $X_P$, $Y_P$. The equation representing intensity of any point in the window 11 is derived using the normalized interpolation equation:

$$P_{P(X)} = P_1(1-X) + P_2(X)$$

where:
$P_{P(X)}$ is a point on a line segment $P_1P_2$ in which
$P_1$ is located at $X = 0$
$P_2$ is located at $X = 1$
$X$ is normalized (range 0 to 1). Along the lower edge 79 of the window 11, substituting $Z_1$, $Z_2$, and $X_P$ into the above equation gives:

$$Z_{79} = Z_1(1 - X_P) + Z_2(X_P)$$

Along the upper edge 81 of the window 11, substituting $Z_4$, $Z_3$, and $X_P$ into the above equation gives:

$$Z_{81} = Z_4(1-X_P) + Z_3(X_P).$$

Utilizing the same normalized interpolation equation but performing a top to bottom interpolation, one obtains:

$$Z_P = Z_{79}(1-Y_P) + Z_{81}(Y_P).$$

Substituting terms,
$Z_P = [Z_1(1-X_P) + Z_2(X_P)](1-Y_P) + [Z_4(1-X_P) + Z_3(X_P)](Y_P),$
$= Z_1(1-X_P)(1-Y_P) + Z_2(X_P)(1-Y_P) + Z_3(X_P)(Y_P) + Z_4(1-X_P)(Y_P).$ Arranging terms, one obtains the equation form implemented by the shading function generator 72:

$$Z_P = Z_1[1-X_P-Y_P+X_PY_P] + Z_2[X_P-X_PY_P] + Z_3[X_PY_P] + Z_4[Y_P-X_PY_P].$$

where: $X_P$ and $Y_P$ are normalized coordinates of instantaneous beam position; $Z_1$, $Z_2$, $Z_3$, and $Z_4$ are intensity coefficients at window corners, and $Z_P$ is instantaneous point intensity.

Referring now to FIG. 2, it may be seen that the instantaneous position of the beam $X_P$, $Y_P$ is obtained along the input lines 51 and 52 from the sweep generator 29 and the amplifier 42 via the shape select means 43. Those values, in analog form, comprise an input to an analog multiplier 82. The conductor 51 also provides a first input to both a summing device 83 and a summing device 84, while the conductor 52 provides a second input to the summing device 83, and a first input to a summing device 85.

A constant generator 86, forming a portion of the shading function generator 72, provides a third input to the summing device 83 along a conductor 87. The generator 86 is conventional and may include an operational amplifier and zener diode, not shown. The voltage across the zener diode will be substantially constant and is chosen so as to provide the desired input at the conductor 87. The multiplier 82 has an output 88, which provides a fourth input to the summing device 83 and second inputs to the summing devices 84 and 85.

A plurality of digital to analog converters (D/A), having memory and multiplier means associated with them, are provided, and are indicated generally by the numerals 89, 90, 91, and 92. Respective ones of the digital to analog converters having memory means receive respective ones of the intensity coefficients $Z_1$, $Z_2$, $Z_3$, and $Z_4$, from the computer 2 along the bus 12, along input conductors 93, 94, 95, and 96, respectively. The means 89 through 92 also are connected to the load control output 68 of the computer 2.

The output of the summing device 83 is an input to a sign change summing device 97. The summing device 97 reverses the polarity of the signal input from the summing device 83, and the output of summing device 97 is an input to the D/A means 89.

Digital to analog converter having memory and multiplier means 89 is conventional in that it includes a digital to analog converter which receives and stores the digital $Z_1$ coefficient information from the computer 2, converts it to an analog value which is the product of $Z_1$ and the coefficient from the summing device 97. Output 99 of the D/A means 89 is the term $[1-X_P-Y_P+X_PY_P]Z_1$, which term is one required in the equation solution of the intensity function $Z_P$. The output 99 provides a first input to a summing device 102.

Digital to analog converter having memory and multiplier means 90 receives and stores a signal input corresponding to coefficient $Z_2$ from the computer 2, converts it into an analog value which is the product of $Z_2$ and the coefficient from the summing device 84. The output of the D/A means 90 appears at a conductor 98 and is the term $[X_P-X_PY_P]Z_2$, which term is required in the solution of the intensity function $Z_P$. The output of D/A means 90 provides a second input to the summing device 102.

The output 88 of the multiplier 82 forms an input to the digital to analog converter having memory and multiplier means 91. D/A means 91 receives the digital coefficient $Z_3$, performs a conversion to analog values, and multiplies that value with the function $X_PY_P$ from the multiplier 82, to give an output at a conductor 100 of the term $[X_PY_P]Z_3$. The output of D/A means 91 provides a third input to the summing device 102.

Output of the summer 85 forms an input to the digital to analog converter having memory and multiplier means 92 along a conductor 117. D/A means 92 receives the digital coefficient $Z_4$, converts it to an analog value, and multiplies the analog value of $Z_4$ with the output of the summer 85, giving the term $[Y_P-X_PY_P]Z_4$ at an output conductor 101. The output of D/A means 92 provides a forth input to the summing device 102.

It may be observed that all the terms necessary for the solution of the equation of the intensity coefficient $Z_P$ are provided, and those terms form an input to a summer 102. A fifth input to the summer 102 is a coefficient described for the purposes of this specification as Z offset, and shown in FIG. 2 as $Z_{off}$. $Z_{off}$ is an absolute bias, which is subtracted from $Z_P$ to set the level where $Z_P=0$ displayed intensity. $Z_{off}$ is obtained from the computer 2 along the data bus 12, at a digital to analog converter (D/A) 103, which converts the digital value of the $Z_{off}$ input to an analog value. That analog value forms an input to a sign change device 104, the output 118 of which is the last input to summer 102.

The output of summer 102, which is the electrical equivalent of the function $[Z_P-Z_{off}]$, forms an input, along a conductor 120, to a comparator and signal selector (C/S) means 105. For visual simulation purposes in describing what intensity is observable in the window 11 with a particular image, the term $[Z_P-Z_{off}]$ corresponds to range attenuation which varies with the distance between an observer of the window 11 and a point in the ground plane of the window. A second input to C/S means 105 is obtained along a conductor 106, from a digital to analog converter (D/A) and storage means 107. D/A means 107 receives an input $Z_{min}$, which is a minimum value clamp level for the shading function generator 72 and corresponds to background intensity of a scene viewed in the window 11, for example, moonlight and haze. The value of $Z_{min}$ is obtained from the computer 2 along the data bus 12. The digital input provided from the computer 2 is converted to an analog value in D/A means 107 and forms an input to the C/S means 105.

Output of the C/S means 105, at a conductor 119, is the most positive input of the signals $[Z_P-Z_{off}]$ and $[Z_{min}]$. The output of C/S means 105 forms an input through a digital to analog converter (D/A) having memory and multiplier means 108. D/A means 108 also receives a function $Z_0$ from the computer 2. $Z_0$ corresponds to light point source or image surface brightness before attenuation and is a digital input to the shading function generator 72 along the bus 12. The D/A means 108 converts the digital input $Z_0$ into an analog value, and multiplies it with the output of the C/S means 105. Output of D/A means 108 is passed through a programmed gain amplifier 109. Amplifier 109 also receives display gain input along a conductor 110. Conductor 110, which is shown as a single electrical path, in actual embodiments of this invention corresponds to the conductors 69 and 70 illustrated in FIG. 1 and shown as terminal inputs on the left side of FIG. 2. This input enables the output of amplifier 109 to be compensated for the different signal levels used in generating the various shapes discussed above. Output of the amplifier 109, indicated as $Z_{out}$, is the larger of $[Z_P-Z_{off}][Z_0][\text{display gain}]$ or $[Z_{min}][Z_0][\text{display gain}]$.

The load control input 68 to D/A 108 and various other elements of FIG. 2 provides signals to initiate storage of digital coefficients in those elements.

From the foregoing, it may be observed that the shading function generator 72 is capable of calculating the intensity of each point of an image displayed in the window 11, in real time, and that the intensity function may be varied across the entire plane of the window. This ability permits the simulator with which our invention finds utility, to exhibit extremely realistic images at the display window 11. In addition, the intensity can vary in real time as the aircraft simulator approaches the image generated. This is accomplished by a relatively simple circuit design, as compared with present state of the art devices.

It will be understood that certain features and subcombinations of our invention are of utility and may be employed without reference to other features and subcombinations. This is contemplated by and is within the scope of the claims.

Numerous variations, within the scope of the appended claims, will be apparent to those skilled in the art in light of the foregoing description and accompanying drawings. Thus, it will be apparent that the entire operation of the device 1 may be conducted digitally. When so conducted, various D/A converters, comparators and related components employed in the $X_L$, $X_R$, $Y$ and $Z$ computers may be eliminated, with the exception of a final converter for each of the X, Y and Z computers required for data presentation on the CRT. At present, state of the art devices for analog processing of data offer cost advantages over comparable digital hardware. While straight line vectors were illustratively utilized in the above description, curved shape generation is possible in other embodiments of this invention. Similarly, while single edge vector generators capable of multiple slope determinations were described, it will be recognized that multiple edge vector generators having single slope capabilities may be used, if desired. In like manner, while the images presented in the window 11 were described as two dimensional figures, the system is compatible with three dimensional image generation. The specification enumerates a number of conductors for electrically connecting various assemblies of our invention. Those skilled in the art will recognize that the diagrammatic illustration of single conductors merely facilitates the verbal description of the circuit under consideration and that the single conductors shown may be conductor pluralities in commercial embodiments of this invention. The information disclosed in the drawings and described above should enable competent practioners to construct physical circuits from the block diagrams shown. If additional circuit design information is desired, it may be obtained, for example, in *Digital to Analog Converter Handbook*, Hybrid Systems Corporation 2 Ed. (1970); and *Analog-to-Digital/Digital-to-Analog Conversion Techniques*, David F. Hoeschele, Jr., John Wiley and Sons (1968). These variations are merely illustrative.

Having thus described the invention, what is claimed and desired to be secured by Letters Patent is:

1. An apparatus for generating an image, comprising:
    a display means, said display means having a desired image visual output, said output being constructed electrically by applying selected control data to said display means for controlling a beam;
    means for generating a beam operatively connected to said display means, said beam being movable to construct the image desired for display;
    means for generating left edge vector data corresponding to an edge of the image desired for display, said left edge vector generating means having an output side;
    means for generating right edge vector data corresponding to a right edge of a desired image, said right edge vector data generating means having an output side;
    means for comparing the instantaneous X coordinate position of the beam with said left edge vector data, said left edge comparing means being operatively connected between said beam generating means and the output side of said left edge vector data generating means;
    means for comparing the instantaneous X coordinate position of the beam with said right edge vector data, said right edge comparing means being operatively connected between said beam generating means and the output side of said right edge vector data generating means;
    sweep control means responsive to a comparison in said left edge comparing means and said right edge comparing means for generating an unblanking signal if said beam is entering the image defined by said left and said right edge vector data, and for incrementing the Y position of said beam, removing said unblanking signal, and reversing the direction of the sweep of said beam if said beam is leaving the image defined by said left and said right edge vector data, said sweep control means being operatively connected to said right and said left edge comparing means and to said beam generating means;
    means for monitoring the Y coordinate position of said beam operatively connected to said sweep control means;
    means for comparing the Y coordinate position of said beam with the Y coordinate of said left edge vector data operatively connected to said Y coordinate monitoring means;
    means for comparing the Y coordinate position of said beam with the Y coordinate of said right edge vector data operatively connected to said Y coordinate monitoring means; and
    means for commanding generation of additional left edge and right edge vector data, said commanding means being operatively connected between said left edge Y coordinate comparing means and said left edge vector data generating means and said right edge Y coordinate comparing means and said right edge vector data generating means.

2. The apparatus of claim 1 wherein said display means comprises a cathode ray tube, said cathode ray tube having a face for displaying the desired image, the apparatus further including means for varying the intensity of the image generated on the face of said cathode ray device, said intensity varying means including means for continuously determining the intensity of each point of said image, said intensity determining means being operatively connected between said sweep generating means and said display means, the intensity determination made by said intensity determining means being dependent upon the X and Y coordinate position of said beam.

3. The apparatus of claim 2 wherein said Y coordinate monitoring means includes means for determining the attainment of a closed geometric shape at said display means, said completion determining means comprising means for receiving a Y coordinate value for a stop point of said image, and comparator means electrically connected to said Y stop point receiving means and said Y coordinate position monitoring means, said last mentioned comparator means having an output side operatively connected to said sweep control means.

4. The apparatus of claim 3 wherein said left edge vector data generating means comprises:
    means for storing the rate of change in an X coordinate direction for one raster line change in a Y coordinate direction for each vector of the left edge of a desired graphic image, said left edge commencing at an X coordinate start point;
    first register means having a first input, a second input, and an output, the first input of said register means receiving said X coordinate start point;
    adder means, said adder means having a first input, a second input, and an output, said first input being electrically connected to the output of said first register means, said second input being electrically connected to said left edge storing means through a second register means, the output of said adder means being electrically connected to the second input of said first register means; and second register means electrically connected between said storage means and the second input of said adder means.

5. The apparatus of claim 4 wherein said right edge vector data generating means comprises:
means for storing the rate of change in an X coordinate direction for one raster line change in a Y coordinate direction for each vector of the right edge of a desired graphic image, said right edge commencing at an X coordinate start point;
third register means having a first input, a second input, and an output, the first input of said third register means receiving said X coordinate start point;
adder means, said adder means having a first input, a second input, and an output, said first input being electrically connected to the output of said third register means, said second input being electrically connected to said right edge storing means through a fourth register means, the output of said adder being electrically connected to said second input of said third register means; and
fourth register means electrically connected between said right edge storing means and said second input of said adder means.

6. An apparatus for generating a desired image on a display means, a plurality of outline points of said image being converted to coordinates corresponding to a Cartesian coordinate system referenced to said display means, comprising:
display means including a visual output for presenting said desired image;
a sweep generator for generating a beam which sweeps the visual output of said display means in a x coordinate direction along parallel raster lines;
means for generating left edge vector data corresponding to a left edge of the desired image;
means for generating right edge vector data corresponding to a right edge of the desired image;
means for comparing the instantaneous beam position with said left and said right edge vector data operatively connected between said left and said right edge vector data generating means and said sweep generator;
sweep control means operatively connected to said comparing means for generating an unblanking signal if said beam is entering the image defined by said left and said right edge vector data, and for incrementing the Y position of said beam, removing said unblanking signal, and reversing the direction of the sweep of said beam is leaving the image defined by said left and right edge vector data;
means for monitoring the Y coordinate position of said beam operatively connected to said sweep control means, said monitoring means including means for comparing the Y coordinate position of said beam with the Y coordinate of said outline point plurality; and
means operatively connected to said sweep generator for continuously determining the intensity of each point of the desired image at said display means, said intensity determining means being operatively connected between said sweep generator and said display means.

7. The apparatus of claim 6 wherein said display means comprises a cathode ray tube, said cathode ray tube having a face for presenting a desired image, said intensity determining means having intensity coefficients of the top and bottom edges of the face of said cathode ray tube and the instantaneous position of said beam as inputs, said intensity determining means being adapted to develop a signal representation of attenuation of image intensity due to a simulated distance of said image from an observer of said cathode ray device.

8. The apparatus of claim 7 wherein said intensity determining means includes means for providing a minimum background intensity signal, and means for selecting the most positive of said minimum background intensity signal and said attenuation representation signal as the output of said intensity determining means.

9. The apparatus of claim 8 wherein said left edge vector data generating means comprises;
means for storing the rate of change in an X coordinate direction for one raster line change in a Y coordinate direction for each vector of the left edge of a closed graphic image, said left edge commencing at an X coordinate start point;
first register means having a first input, a second input, and an output, the first input of said register means receiving said X coordinate start point;
adder means, said adder means having a first input, a second input, and an output, said first input being electrically connected to the output of said first register means, said second input being electrically connected to said left edge storing means through a second register means, the output of said adder means being electrically connected to the second input of said first register means; and
second register means electrically connected between said storage means and the second input of said adder means.

10. The apparatus of claim 9 wherein said right edge vector data generating means comprises:
means for storing the rate of change in an X coordinate direction for one raster line change in a Y coordinate direction for each vector of the right edge of a closed graphic image, said right edge commencing at an X coordinate start point;
third register means having a first input, a second input, and an output, the first input of said third register means receiving X coordinate start point;
adder means, said adder means having a first input, a second input, and an output, said first input being electrically connected to the output of said third register means, said second input being electrically connected to said right edge storage means through a fourth register means, the output of said adder being electrically connected to said second input of said third register means; and
fourth register means electrically connected between said right edge storing means and said second input of said adder means.

11. The apparatus of claim 10 wherein said means for monitoring the Y coordinate position of said beam comprises:
counter means, said counter means having a first input, a second input, and an output, said first input including an initial Y coordinate position of said X coordinate right edge and said X coordinate left edge start points, said second input including a signal representative of the change in Y position of said beam;

means for receiving and comparing the Y coordinate position of a plurality of outlying points for the left edge of said image, said last mentioned means being electrically connected to the output of said counter means; and means for receiving and comparing the Y coordinate position of a plurality of outlying points for the right edge of said image, said last mentioned means being electrically connected to the output of said counter means.

12. An apparatus for generating an image, comprising: display means for displaying a desired image;

beam generating means for generating a beam at said display means, said beam generating means being operatively connected to said display means;

means for generating left edge vector data for the image displayed at said display means;

means for generating right edge vector data for the image displayed at said display means;

means for comparing the instantaneous beam position generated in said beam generating means with said left and said right edge vector data, said comparing means being operatively connected between respective ones of said right and said left edge vector data generating means and said beam generating means;

means responsive to said beam position comparison for reversing the direction of movement of said beam and incrementing the Y position of said beam operatively connected to said comparing means and to said beam generating means;

means for monitoring the Y coordinate position of said beam operatively connected to said beam comparison responsive means, said Y position monitoring means including means for comparing the Y coordinate position of said beam with the Y coordinate of said left and said right edge vector data;

means responsive to said Y coordinate comparison for commanding additional left and right edge vector data until a completed image is formed at said display means; and means responsive to the instantaneous position of said beam for continuously determining the intensity of each point of said beam, said intensity determining means being operatively connected between said beam generating means and said display means.

13. The apparatus of claim 12 wherein said display means includes a window having corners for presenting the desired image, said intensity determining means including means for solving an interpolation equation in the form:

$$Z_p = Z_1(1 - X_p Y_p + X_p Y_p) + Z_2(X_p - X_p Y_p) + Z_3(X_p Y_p) + Z_4(Y_p - X_p Y_p),$$

where $X_p$ and $Y_p$ are normalized coordinates of instantaneous beam position, $Z_1$, $Z_2$, $Z_3$, and $Z_4$ are intensity coefficients at the corners of the window of said display means, and $Z_p$ is the instantaneous position intensity of said beam.

14. An apparatus for generating an image by sweeping a beam across the face of a display means, a plurality of outline points of said image being given in coordinates corresponding to one of a first axis and a second axis of a coordinate system along a display face of said display means, comprising:

a display means for displaying a desired image at a display face;

means for generating data for at least one left edge vector corresponding to a left edge of said image of said cathode ray device;

means for generating data for at least one right edge vector corresponding to a vector on the right edge of said image on said display means;

means for generating a movable beam for sweeping the display face of said display means;

means for comparing the instantaneous first axis coordinate position of the beam at said display face with said left edge vector data, said last mentioned means being operatively connected between said beam generating means and said left edge vector data generating means;

means for comparing the instantaneous first axis coordinate position of the beam at said cathode ray device with said right edge vector data operatively connected between said beam generating means and said right edge vector data generating means;

sweep control means operatively connected to said right edge comparing means, said left edge comparing means and said beam generating means, said sweep control means generating an unblanking signal when said beam is entering the image defined by said left and said right edge vector data, and for incrementing the second axis position of said beam, removing said unblanking signal, and reversing the direction of beam travel if said beam is leaving the image defined by said left and said right edge vector data;

means for monitoring the second axis coordinate position of said beam, said monitoring means being operatively connected to said sweep control means;

means for comparing the second axis coordinate position of said beam with the second coordinate of said outlying point plurality operatively connected to said second axis coordinate position monitoring means; and means operatively connected to said second axis coordinate position comparing means, said left edge vector generating means and said right edge vector generating means for commanding additional left and right edge vector data whenever a second axis coordinate comparison is made.

15. In a display device, including means for displaying an electrically generated image, said display means forming the viewing area of a display window, said display window having a top and a bottom, and means for generating an image at said display window by sweeping an electronic beam along parallel lines across said display window and means for generating said electronic beam, the improvement which comprises means for varying the intensity of an image formed at said display window, said intensity varying means including means for receiving a predetermined intensity value for the top and bottom of said display window, and for interpolating the intensity of all other points between said top and said bottom edges based on said predetermined values, said receiving and interpolating means being operatively connected to said beam generating means and to said display means.

16. The improvement of claim 15 including summing means, said summing means having the output of said receiving and interpolating means as a first input, and means for developing a signal representation of attenuation of image intensity due to the simulated distance of said image from an observer of said display window, the output of said last mentioned means forming a second input to said summing means.

17. The improvement of claim 16 including a comparator and signal selector means having the output of said summing means as a first input, and means for providing a minimum background intensity signal, said minimum background intensity signal forming a second input to said comparator and signal selector means, said comparator and signal selector means selecting the most positive of said minimum background intensity signals and said attenuation representation signal as an output of said intensity varying means.

18. The improvement of claim 17 wherein the image formed in said display window is defined by a plurality of outline points and coordinates corresponding to a Cartesian coordinate system along said display window, said image forming means including:
means for generating left vector data corresponding to an edge of said image;
means for generating right edge vector data corresponding to an edge of said image;
means for comparing the instantaneous X coordinate position of the beam with said left edge vector data operatively connected between said left edge vector data generating means and said beam generating means;
means for comparing the instantaneous X coordinate position of said beam with said right edge vector data operatively connected between said right edge vector data generating means and said beam generating means;
sweep control means operatively connected to said right and said left edge vector data comparing means for generating an unblanking signal if said beam is entering the image defined by said left and said right edge vectors, and for incrementing the Y position of said beam, removing said unblanking signal, and reversing the direction of the sweep of said beam as said beam is leaving the image defined by said left and said right edge vectors, said sweep control means being operatively connected to said beam generating means and said right and said left edge vector data comparing means;
means for monitoring the Y coordinate position of said beam, said monitoring means being operatively connected to said sweep control means;
means for comparing the Y coordinate position with the Y coordinate of said outline point plurality, said last mentioned comparing means being operatively connected to said Y coordinate position monitoring means; and
means for commanding additional left and right edge vectors operatively connected between said Y coordinate position monitoring means and said left and said right edge vector data generating means.

19. The apparatus of claim 18 wherein said display means includes a cathode ray tube and said left edge vector data generating means comprises:
means for storing the rate of change in an X coordinate direction for one raster line change in a Y coordinate direction for each vector of the left edge of a closed graphic image, said left edge commencing at an X coordinate start point;
first register means having a first input, a second input, and an output, the first input of said register means receiving said X coordinate start point;
adder means, said adder means having a first input, a second input, and an output, said first input being electrically connected to the output of said first register means, said second input being electrically connected to said left edge storing means through a second register means, the output of said adder means being electrically connected to the second input of said first register means; and
second register means electrically connected between said storage means and the second input of said adder means.

20. The apparatus of claim 19 wherein said right edge vector data generating means comprises:
means for storing the rate of change in an X coordinate direction for one raster line change in a Y coordinate direction for each vector of the right edge of a closed graphic image, said right edge commencing at an X coordinate start point;
third register means having a first input, a second input, and an output, the first input of said third register means receiving said X coordinate start point;
adder means, said adder means having a first input, a second input, and an output, said first input being electrically connected to the output of said third register means, said second input being electrically connected to said right edge storage means through a fourth register means, the output of said adder being electrically connected to said second input of said third register means; and
fourth register means electrically connected between said right edge storage means and said second input of said adder means.

21. The apparatus of claim 20 wherein said means for monitoring the Y coordinate position of said beam comprises:
counter means, said counter means having a first input, a second input, and an output, said first input including an initial Y coordinate position of said X coordinate right edge and said X coordinate left edge start points, said second input including a signal representative of the change in Y position of said beam;
means for receiving and comparing the Y coordinate position of a plurality of outline points for the left edge of said image, said last mentioned means being electrically connected to the output of said counter means; and
means for receiving and comparing the Y coordinate position of a plurality of outline points for the right edge of said image, said last mentioned means being electrically connected to the output of said counter means.

22. In a device having a display means observable at a window, said window having a top and a bottom, and means for generating an image at said display window, the improvement comprising means for providing intensity variation of an image at said display window, said intensity varying means including means for receiving a predetermined intensity value for the top and the bottom of said display window, and means operatively connected to said intensity value receiving means for providing an intensity signal having a value between the value of said predetermined top and said bottom intensity values for all other points in said display window, said intensity signal providing means operating simultaneously with said image generating means to produce an image at said display window.

23. The improvement of claim 22 wherein said intensity determining means includes means for solving an interpolation equation in the form:

$$Z_p = Z_1(1-X_p-Y_p+X_pY_p) + Z_2(X_p-X_pY_p) + Z_3(X_pY_p) + Z_4(Y_p-X_pY_p).$$

where $X_p$ and $Y_p$ are normalized coordinates of instantaneous beam position, $Z_1$, $Z_2$, $Z_3$, and $Z_4$ are intensity coefficients at the corners of the window of said display means, and $Z_p$ is the instantaneous position intensity of said beam.

* * * * *

UNITED STATES PATENT AND TRADEMARK OFFICE
CERTIFICATE OF CORRECTION

PATENT NO. : 3,996,673
DATED : December 14, 1976
INVENTOR(S) : Carl J. Vorst and John Mackey It is certified that error appears in the above-identified patent and that said Letters Patent are hereby corrected as shown below:

Col. 6, line 48, "in advance to the beam" should be "in advance of the beam".

Col. 15, line 55, "of said beam is" should be "of said beam if said beam is".

Col. 18, line 4, "image of" should be "image on".

Col. 19, line 20, "left vector data" should be "left edge vector data".

Signed and Sealed this

Nineteenth Day of April 1977

[SEAL]

Attest:

RUTH C. MASON
Attesting Officer

C. MARSHALL DANN
Commissioner of Patents and Trademarks